Patented July 26, 1949

2,477,080

UNITED STATES PATENT OFFICE 2,477,080

ANTACID PREPARATION

Heinrich Necheles, Chicago, Ill., and Harry Kroll, Cranston, R. I., assignors to Michael Reese Research Foundation, Chicago, Ill., a nonprofit corporation of Illinois No Drawing. Application July 15, 1947, Serial No. 761,152

6 Claims. (Cl. 167—55)

This invention relates to new and useful pharmaceutical preparations. More particularly, it is concerned with such preparations which are especially characterized by their improved antacid and/or anti-constipating action.

The use of acid neutralizing agents for the treatment of peptic ulcers and excessive gastric acid secretion is well known. For the most part, these agents may be divided into two classes: (1) systemic antacids, and (2) nonsystemic antacids. The first class comprises water soluble salts such as sodium bicarbonate, odium acetate, sodium lactate, sodium caseinate, sodium glycolate, etc., which are absorbed, either directly or after breakdown, from the intestinal tract into the body fluids. The second group of antacids are insoluble, inorganic compounds such as calcium carbonate, hydrated aluminum oxide, magnesium trisilicate, ion exchange resins, detergents, etc., which are not capable of being absorbed or of which little is absorbed.

Antacid preparations heretofore available have been subject to one or more marked disadvantages, among them being a transient neutralizing action due to the nature of the drug or the fact that it is almost immediately emptied from the stomach, excessive alkalinity in the intestinal tract or circulating body fluids, evolution of excessive amounts of gas, and constipating action requiring simultaneous administration of laxatives and in some instances even surgical intervention to remove the obstruction. Frequently in the case of peptic ulcers complicated by other organic disorders, the use of laxatives is undesirable.

We have discovered a novel antacid preparation comprising mixtures of carboxymethyl cellulose or its salts with agents capable of neutralizing acid, which preparation controls acidity over extended periods of time, is non-constipating and promotes the healing of ulcerated areas.

Carboxymethyl cellulose may be used as such or, preferably, in the form of its soluble salts such as its lithium, sodium or potassium salts. The number of carboxymethyl groups (i. e. the degree of substitution=d. s.) present per glucose unit of the cellulose molecule may range upward to about two, provided no extensive degradation has occurred during manufacture. Carboxymethyl cellulose having a degree of substitution in the range of about .5 to 1.5 is especially well suited for our new preparation. Sodium carboxymethyl cellulose having a degree of substitution of 1 appears to be particularly desirable, since preparations made therewith have an enhanced anti-constipating action.

Agents suitable for use with the carboxymethyl cellulose or salts thereof are, generally speaking, those agents capable of neutralizing acid whose pH is not so high as to be physiologically detrimental. Illustrative of agents which may be used according to the present invention are those phosphates, carbonates or bicarbonates, oxides or hydroxides or hydrates thereof, and silicates of sodium, potassium, lithium, calcium, magnesium and aluminum whose pH is not so high as to be physiologically detrimental; ion exchange resins; hydrated silica, or amino acids and salts thereof including casein, milk, and other proteins and their hydrolysates; also suitable acetates, citrates, lactates, etc. Other agents which may be incorporated for therapeutic purposes are sedatives, such as phenobarbital, or antispasmodics such as adiphenine, or detergents such as sodium lauryl sulfonate, etc.

It is well known in the field of gastroenterology that the stomach is a dynamic organ in that it is in a continual state of secretion and/or motion the extent of which depends on a number of factors, such as emotional, physiological and environmental factors. Thus an antacid of the prior art when introduced into the stomach may be removed almost immediately by the action of the stomach itself before the substance can exert any marked neutralizing action. Both clinical tests on humans and experiments on animals have shown that there is frequently little correlation between the amounts of hydrochloric acid neutralized in vitro and in vivo by a given substance.

Compared to previously known antacids our new preparation has a greatly lengthened period of effect upon the gastric pH. This is illustrated by the following tests upon dogs weighing from 18 to 35 kilograms. The dogs had gastrostomies with a metal cannula in the most dependent part of the gastric fundus. The dogs were starved during the 24 hours previous to the tests and, immediately before the tests, their stomachs were washed with saline through the cannula to assure removal of solid particles. Each dog was injected subcutaneously with 1 milligram of histamine dihydrochloride in 2 cubic centimeters of saline. The antacid was introduced immediately through the cannula and, at 15 minute intervals, the pH of the stomach contents was determined. The gastric secretion due to the histamine injection lasted for about 75 minutes and was at its peak at 45 minutes after the injection. The number of minutes the antacid kept the pH above 3.5 (the pH at and above which pepsin becomes inactive) is shown in the following table.

| Antacid Preparation | No. of Dogs | Minutes |
| --- | --- | --- |
| 50 cc. 10% SCMC [1] (d. s.=.5) | 16 | 0 |
| 50 cc. 1% aqueous sodium bicarbonate solution | 16 | 0 |
| 50 cc. of 1% aqueous sodium bicarbonate plus 10% SCMC (d. s=.5) | 16 | 52 |
| 50 cc. of 1% calcium carbonate suspension in water | 16 | 24 |
| 50 cc. of 1% calcium carbonate suspension in water plus 10% SCMC (d. s.=.5) | 16 | 40 |

[1] SCMC=sodium carboxy methyl cellulose.

In another test in dogs, 3 tablets each containing 150 milligrams of magnesium oxide administered along with 25 cubic centimeters of saline maintained the pH of the stomach contents at 3.5 or above for less than 15 minutes whereas 3 tablets each containing 450 milligrams of sodium carboxymethyl cellulose (d. s.=1) and 150 milligrams of magnesium oxide administered with 25 cubic centimeters saline kept the pH above 3.5 for 75 minutes.

These results have been confirmed in human subjects whose gastric secretion had been stimulated by the subcutaneous injection of 0.33 milligram of histamine dihydrochloride. By the administration of 150 milligrams (0.0075 equivalent) of magnesium oxide the gastric pH was maintained above 3.5 for 15 minutes. However, when the same quantity of magnesium oxide was administered under the same conditions except with the addition of 450 milligrams (0.0017 equivalent) of sodium carboxymethyl cellulose (d. s.=1), the gastric pH was maintained above pH 3.5 for 75 minutes. These data clearly show that the addition of a small fraction of the equivalent amount of sodium carboxymethyl cellulose to the magnesium oxide results in a manifold increase in the length of time the gastric pH is controlled.

Our new preparation appears to spread over the stomach mucosa as a viscous film in contrast to the action of tablets of commonly used antacids in solution which leave the stomach rapidly, or in particles or suspensions which tend to disperse as small insoluble particles, most of which are expelled from the stomach at a rate dependent on its motility. The spreading and adhesive action of our preparation has been observed at autopsy in dogs and by gastroscopic and X-ray studies in man, which demonstrate that some of our preparation coats the stomach and duodenum for prolonged periods.

Our new preparation appears to cause a reduced volume of secretion to be present in the stomach. This may be due to an actual reduction in the amount of gastric secretion or the faster emptying of the stomach or both. This is shown by the following data:

Seven human subjects who had been fasting, each received an injection of 0.33 milligram of histamine dihydrochloride. A thin tube was passed to the stomach without local anesthesia. Immediately after the histamine injection 100 cubic centimeters of water was drunk by each subject. In the control test they received nothing else. In a second test they received in addition 4 tablets each containing 150 milligrams of magnesium oxide. In the third test they received 4 tablets each containing 450 milligrams of sodium carboxymethyl cellulose (d. s.= 1) and 150 milligrams of magnesium oxide. At 15 minute intervals the volume of the stomach contents was measured. The volumes measured over a 75 minute period were totalled. The average total volumes measured were:

| Substance | Average Total Volume |
| --- | --- |
| | Cc. |
| Control | 410 |
| Magnesium Oxide | 400 |
| MgO+SCMC | 280 |

The results obtained with dogs having gastrostomies were similar. In dogs, however, in which pouches are created so that all of the gastric juice secreted within the pouch can be collected, only a small diminution in the volume of gastric secretion was noted.

These factors—the control of gastric pH over long periods, the spreading action and the formation of an adhesive protective coating on the gastric mucosa, and the faster emptying of the stomach which shortens the period of exposure of the gastric and duodenal mucous membranes and of ulcers of the stomach and duodenum to the corrosive effects of hydrochloric acid and pepsin—all promote healing of ulcerated areas.

The marked anti-constipating nature of our new preparation is clearly illustrated by a comparison of the results obtained with hydrated aluminum oxide alone and when incorporated with sodium carboxymethyl cellulose in one variant of our new preparation.

Eighty-six male rats were divided into two groups. One group was fed a standard diet containing 5% hydrated aluminum oxide, and the second the same diet with 20% sodium carboxymethyl cellulose (d. s.=1) added. The rats ate the diet well. The average daily weight of the feces of the rates receiving the sodium carboxymethyl cellulose was 69% higher than that of the other group of rats. The feces of the rats receiving the sodium carboxymethyl cellulose were soft and sticky whereas the feces of the other group were dry and non-sticky. These results indicate a very much higher water content of the feces from the rats fed the diet containing the aluminum oxide-sodium carboxymethyl cellulose mixture. Analyses showed that calcium and phosphate were not excreted in larger amounts than during the control period so that the administration of our preparation does not affect the calcium balance of the body.

The practical significance of the non-constipating action of our new preparation is confirmed by clinical experience with human patients who often become badly constipated on an antacid comprising hydrated aluminum oxide within a period of a few days. Such patients must resort to the use of an agent such as mineral oil which is known to prevent absorption of the fat-soluble vitamins and of essential fatty acids present in the diet. These patients on changing to our new preparation, including variants containing hydrated aluminum oxide, become free from constipation without using laxatives, etc., and remain so over extended periods.

Our new preparations may be administered either in solid form such as tablets, flakes or granules, etc., or as a liquid. The preparations in either form may be administered at such intervals as may be desired to relieve occasional discomfort or sufficiently frequently to buffer the stomach contents for extended periods.

A suitable formulation for the tablet form may be prepared by mixing the desired salt of carboxymethyl cellulose, neutralizing agent, requisite binding, flavoring and lubricating agents, etc., and tableting according to accepted methods. Such tablets may be prepared from the following formulation of a presently preferred embodiment of the invention which, however, is offered by way of illustration, rather than by way of limitation.

Material and formula

| Ingredient | | Amount |
|---|---|---|
| Sodium carboxymethyl cellulose (d. s.=1) | grams | 11,250 |
| Magnesium oxide heavy U. S. P. | do | 3,750 |
| Corn starch U. S. P. | do | 3,750 |
| Tragacanth B. C. | do | 300 |
| Oil of peppermint | cc | 12 |
| Mineral oil | cc | 45 |
| Magnesium stearate | cc | 30 |
| Isopropyl alcohol (80%) q. s. | | |

Procedure

Triturate the tragacanth with the corn starch followed by the magnesium oxide and other secondary ingredients. Mix thoroughly with the sodium carboxymethyl cellulose previously passed through a No. 16 sieve. Granulate with isopropyl alcohol (80%) and pass through a No. 16 sieve, slug, and compress to tablets weighing about 0.75 gram.

The SCMC (d. s.=1) of the foregoing illustrative example may be replaced by SCMC or by carboxymethyl cellulose wherein the degree of substitution ranges from 0.5 to 1.5 or by another suitable salt of the latter, with equally good results.

Other agents may be substituted for the magnesium oxide in the foregoing illustrative example. Thus, essentially corresponding quantities of the following agents may be used as desired: lithium carbonate, sodium bicarbonate, potassium bicarbonate, calcium bicarbonate, calcium carbonate, magnesium bicarbonate, magnesium carbonate, aluminum phosphate, aluminum oxide (hydrated), aluminum acetate, sodium lactate, lithium lactate, magnesium lactate, sodium amino acetate, calcium lactate, magnesium citrate, sodium caseinate, calcium caseinate, dry skim milk, magnesium trisilicate, and ion exchange resins such as the "Amberlite" (phenol-formaldehyde) and "Ionac" (melamine resin) type of substance, etc.

Our new preparation may also be prepared for administration in liquid form by adding to an aqueous solution of sodium carboxymethyl cellulose (e. g. of 5 or 10% concentration), the corresponding amount of magnesium oxide or other desired acid neutralizing agent, requisite flavoring and sweetening agents such as oil of peppermint and saccharin, and a preservative such as sodium benzoate or butyl-p-hydroxy benzoate, etc.

Having thus disclosed the invention, what is claimed is:

1. A pharmaceutical preparation which is characterized by its antacid and anti-constipating properties and which, upon administration, clings to and protects the gastro-duodenal mucosa, by remaining in contact therewith for an extended period of time, said preparation comprising a member selected from the group consisting of carboxymethyl cellulose and soluble salts thereof, and a non-toxic acid neutralizing agent.

2. A pharmaceutical preparation according to claim 1, wherein the number of carboxymethyl groups present per glucose unit of the cellulose molecule of the carboxymethyl cellulose or salt thereof is at least 0.5.

3. A pharmaceutical preparation according to claim 1, wherein the number of carboxymethyl groups present per glucose unit of the cellulose molecule of the carboxymethyl cellulose or salt thereof is 1, whereby its anticonstipating action is enhanced.

4. An antacid comprising sodium carboxymethyl cellulose and magnesium oxide.

5. An antacid comprising sodium carboxymethyl cellulose and calcium carbonate.

6. An antacid comprising sodium carboxymethyl cellulose and sodium bicarbonate.

HEINRICH NECHELES.
HARRY KROLL.

REFERENCES CITED

The following references are of record in the file of this patent:

UNITED STATES PATENTS

| Number | Name | Date |
|---|---|---|
| 1,645,099 | Shiraishi | Dec. 27, 1927 |
| 2,166,868 | Jones | July 18, 1939 |
| 2,196,768 | Hiatt | Apr. 9, 1940 |

OTHER REFERENCES

Hollabaugh: Industrial and Engineering Chemistry, Oct., 1945, page 945.

Kinnard: Foreign Commerce Weekly, May 15, 1943, pages 11, 13.

Gutman: Modern Drug Encyclopedia, 3rd ed. (1946) page 720.